(12) United States Patent
Zhang et al.

(10) Patent No.: US 12,047,172 B2
(45) Date of Patent: Jul. 23, 2024

(54) SYSTEMS AND METHODS FOR PDCCH REPETITION RECEPTION

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Hong He, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 17/593,326

(22) PCT Filed: Jan. 14, 2021

(86) PCT No.: PCT/CN2021/071899
§ 371 (c)(1),
(2) Date: Sep. 15, 2021

(87) PCT Pub. No.: WO2022/151245
PCT Pub. Date: Jul. 21, 2022

(65) Prior Publication Data
US 2023/0171031 A1     Jun. 1, 2023

(51) Int. Cl.
*H04L 1/08*     (2006.01)
*H04W 72/23*     (2023.01)

(52) U.S. Cl.
CPC ............... *H04L 1/08* (2013.01); *H04W 72/23* (2023.01)

(58) Field of Classification Search
CPC ..... H04W 72/23; H04W 24/08; H04W 48/16; H04W 76/11; H04W 76/27; H04L 5/00; H04L 5/001; H04L 5/0053; H04L 25/0204; H04L 1/08
See application file for complete search history.

(56) References Cited

U.S. PATENT DOCUMENTS

| 2018/0145818 A1 | 5/2018 | Choi et al. |
| 2019/0150073 A1 | 5/2019 | Tiirola et al. |
| 2019/0223164 A1* | 7/2019 | He .................... H04L 25/0204 |

OTHER PUBLICATIONS

Qualcomm Incorporated, "PDCCH Monitoring Reduction and Power Saving for RedCap Devices", 3GPP TSG RAN WG1 #102-e, R1-2006812, Aug. 28, 2020, 12 sheets.

* cited by examiner

*Primary Examiner* — Dady Chery
(74) *Attorney, Agent, or Firm* — Fay Kaplun & Marcin, LLP

(57) ABSTRACT

A user equipment (UE) monitors a Physical Downlink Control Channel (PDCCH). The UE receives a configuration for a physical downlink control channel (PDCCH) including repetitions for PDCCH candidates comprising first PDCCH data, wherein the PDCCH candidates are repeated across multiple durations of a DL resource grid, detects, based on a repetition detection scheme, each of the PDCCH candidates and combines soft bits from each of the PDCCH candidates, wherein the combined soft bits are jointly decoded to determine the first PDCCH data and calculates a number of blind decodes (BDs) for the durations of the DL resource grid carrying the PDCCH candidates, wherein at least one BD value for the PDCCH candidates is scaled by a scaling factor for the calculation of the number of BDs.

20 Claims, 7 Drawing Sheets

500

| Slot | 0 | 1 | 2 | 3 | 4 | 5 |
|---|---|---|---|---|---|---|
| USS 1 | PDCCH repetition set 1 | | | PDCCH repetition set 2 | | PDCCH repetition set 3 |
| USS 2 | | PDCCH repetition set 1 | PDCCH repetition set 2 | | PDCCH repetition set 3 | |
| USS 3 | 20 | 20 | 18 | 16 | 16 | 20 |
| Total number of BD | 20+10*0.5=25 | 20+10*1.5=35 | 18+22*0.5=29 | 16+22*1.5=49 | 16+20*0.5=26 | 20+20*1.5=50 |

| Slot | 0 | 1 | 2 | 3 | 4 | 5 |
|---|---|---|---|---|---|---|
| CSS 0 | 20 | 20 | 18 | 16 | 16 | 20 |
| USS 1 | PDCCH repetition set 1 | | | PDCCH repetition set 2 | | PDCCH repetition set 3 |
| USS 2 | | PDCCH repetition set 1 | PDCCH repetition set 2 | | PDCCH repetition set 3 | |
| Total number of BD | 20+10*0.5=25 | 20+10*1.5=35 | 18+22=40 | 16 | 16+20=36 | 20+20*1.5=50 |

Number of BD is re-calculated    Dropped

Fig. 6

SYSTEMS AND METHODS FOR PDCCH REPETITION RECEPTION

BACKGROUND INFORMATION

The physical downlink control channel (PDCCH) search space refers to an area in the downlink resource grid where the PDCCH may be carried. For a user equipment (UE) to decode the PDCCH, the UE needs to know the location of the PDCCH (control channel element (CCE) aggregation level and each CCE index), structure, scrambling code, etc. However, each PDCCH supports multiple DCI formats and aggregation levels. The UE is not informed of which DCI format or aggregation level is used, and thus needs to perform blind decoding throughout the search space to find the transmitted downlink control information (DCI). A maximum number of blind decodes or CCEs to search may be defined in the 3GPP standards, e.g., on a per-slot basis or a per-span basis.

To improve the reliability of the PDCCH decoding, multiple repetitions of the same PDCCH payload may be transmitted. The UE may attempt to decode each repetition independently or combine the soft bits from each repetition and decode the combined bits. The processing burden for the UE may be unequally spread across multiple slots carrying the PDCCH repetitions.

SUMMARY

Some exemplary embodiments are related to a processor of a user equipment (UE) configured to perform operations. The operations include comprising receiving a configuration for a physical downlink control channel (PDCCH) including repetitions for PDCCH candidates comprising first PDCCH data, wherein the PDCCH candidates are repeated across multiple durations of a DL resource grid, detecting, based on a repetition detection scheme, each of the PDCCH candidates and combining soft bits from each of the PDCCH candidates, wherein the combined soft bits are jointly decoded to determine the first PDCCH data and calculating a number of blind decodes (BDs) for the durations of the DL resource grid carrying the PDCCH candidates, wherein at least one BD value for the PDCCH candidates is scaled by a scaling factor for the calculation of the number of BDs.

Other exemplary embodiments are related to a user equipment (UE) having a transceiver configured to communicate with a network and a processor communicatively coupled with the transceiver and configured to perform operations. The operations include receiving a configuration for a physical downlink control channel (PDCCH) including repetitions for PDCCH candidates comprising first PDCCH data, wherein the PDCCH candidates are repeated across multiple durations of a DL resource grid, detecting, based on a repetition detection scheme, each of the PDCCH candidates and combining soft bits from each of the PDCCH candidates, wherein the combined soft bits are jointly decoded to determine the first PDCCH data and calculating a number of blind decodes (BDs) for the durations of the DL resource grid carrying the PDCCH candidates, wherein at least one BD value for the PDCCH candidates is scaled by a scaling factor for the calculation of the number of BDs.

Still further exemplary embodiments are related to a processor of a base station configured to perform operations. The operations include configuring a physical downlink control channel (PDCCH) for a user equipment (UE), the PDCCH including repetitions for PDCCH candidates comprising first PDCCH data, wherein the PDCCH candidates are repeated across multiple durations of a DL resource grid, wherein the UE is to use a repetition detection scheme to detect each of the PDCCH candidates and combine soft bits from each of the PDCCH candidates, wherein the combined soft bits are jointly decoded to determine the first PDCCH data and signaling to the UE a scaling factor for the calculation of a number of blind decodes (BDs) for the durations of the DL resource grid carrying the PDCCH candidates, wherein the UE scales at least one BD value for the PDCCH candidates by the scaling factor for the calculation of the number of BDs.

BRIEF DESCRIPTION OF THE DRAWINGS

FIG. 5 shows a diagram for counting blind decodes (BDs) in an exemplary PDCCH repetition operation according to various exemplary embodiments described herein.

FIG. 6 shows a diagram for counting blind decodes (BDs) for a search space overbooking scenario in an exemplary PDCCH repetition operation according to various exemplary embodiments described herein.

DETAILED DESCRIPTION

Figure 1:
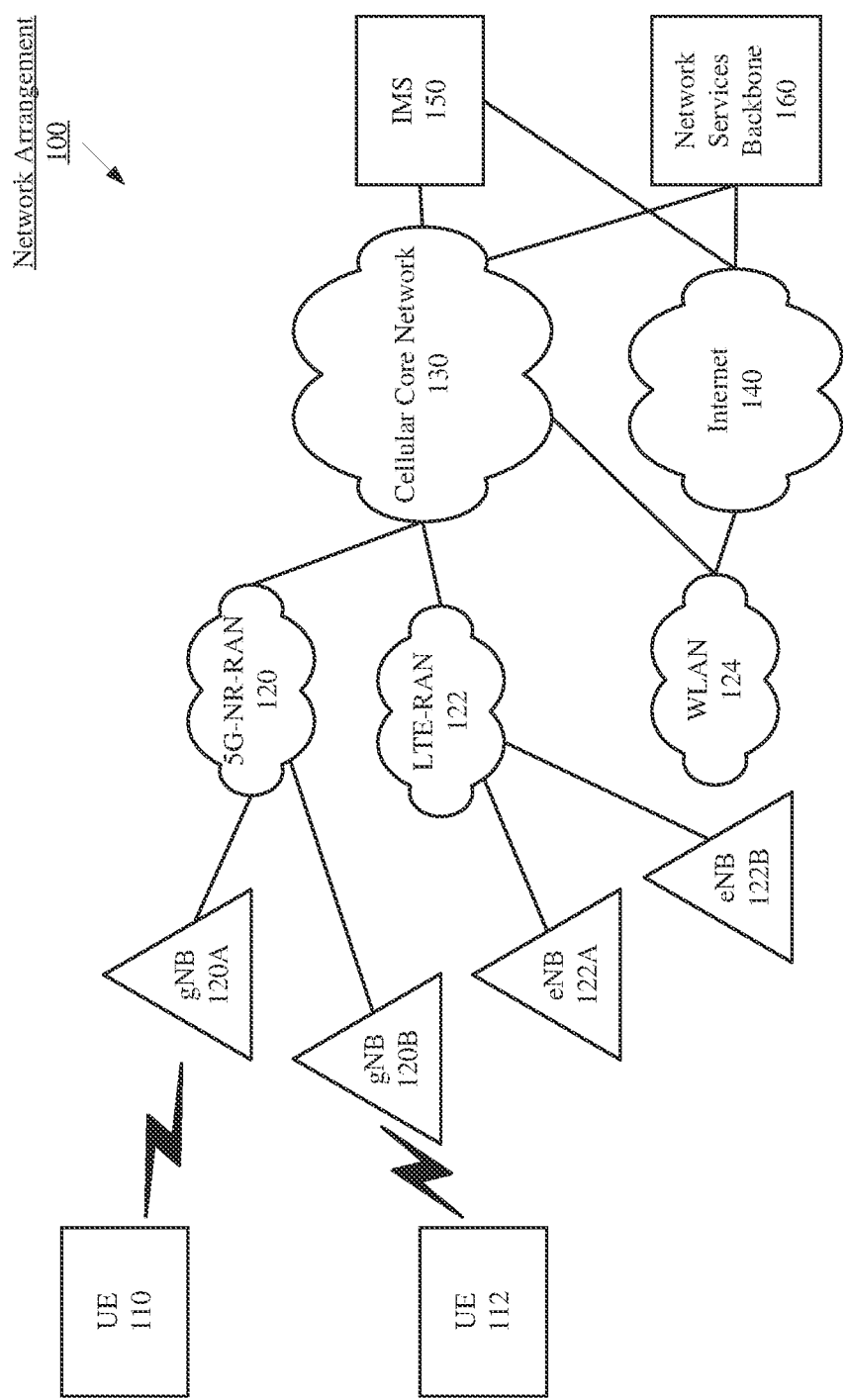
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe operations for counting a number of blind decodes (BDs) or control channel elements (CCEs) for physical downlink control channel (PDCCH) data when some or all of the PDCCH data is transmitted using PDCCH repetition. The BD/CCE count may be determined by a user equipment (UE) and compared to a specified maximum BD/CCE limit for a given duration, e.g., per-slot, multi-slot or per-span, to ensure that the BDs/CCEs do not exceed the specified limit for the duration. In scenarios where the BD/CCE limit is exceeded, indicating that the duration is overbooked, operations are described for reducing the BD count by dropping certain search spaces (SSs) or control resource sets (CORESETs) for the UE to search and recalculating the BD/CCE count until the count is within the specified limits.

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g., legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g., the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
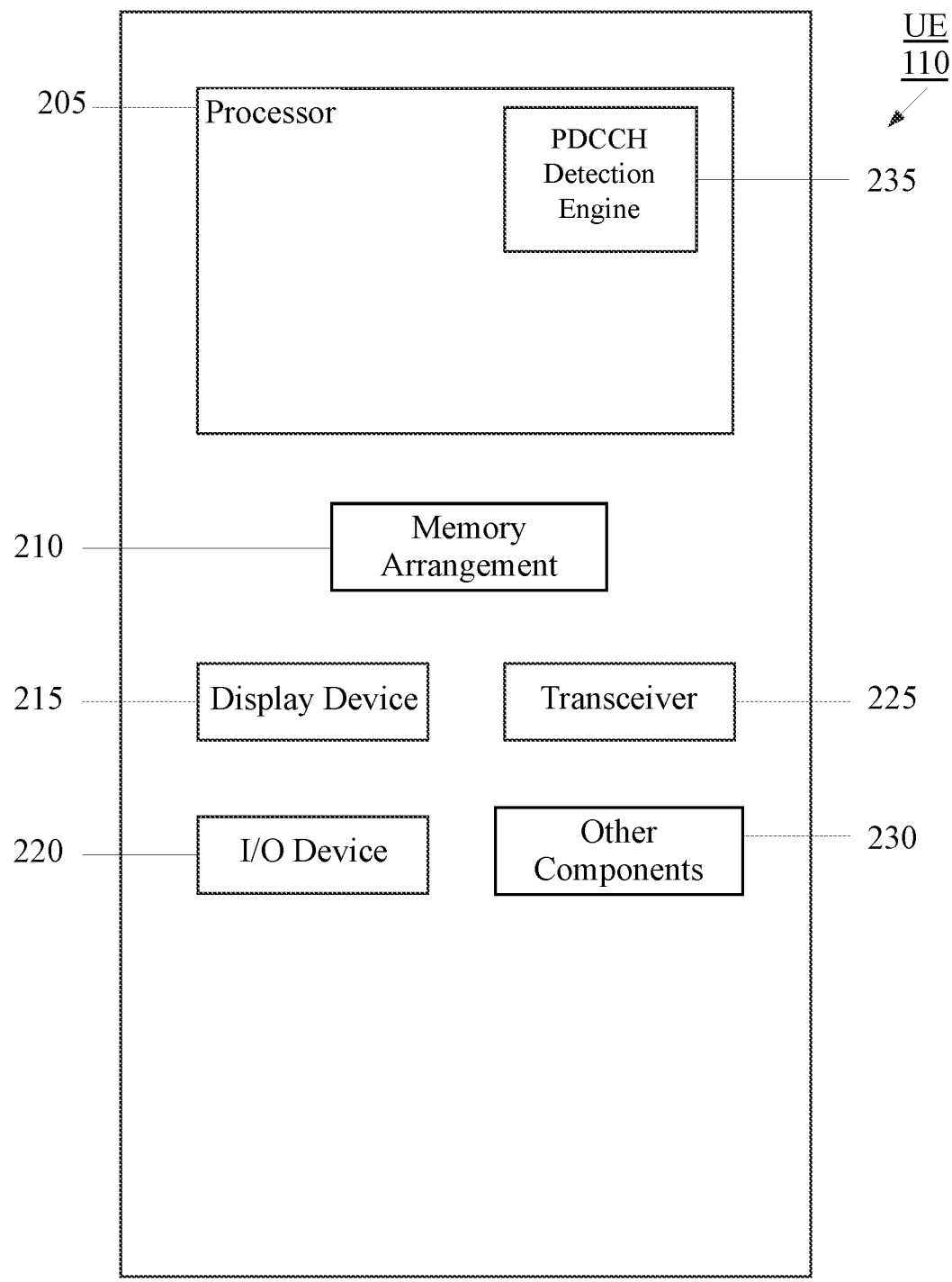
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a PDCCH detection engine 235 for performing operations including selecting a decoding scheme for PDCCH repetitions in a repetition set and determining a scaling factor for search spaces (SSs) or control resource sets (CORESETs) carrying the PDCCH repetitions. The operations may further include calculating a number of blind decodes (BD) to be used for the PDCCH reception, based in part on the scaling factors for the SS/CORESET carrying PDCCH repetitions, and, when the number of BDs exceeds a specified limit, implementing overbooking operations to reduce the BD count to within the specified limit, to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
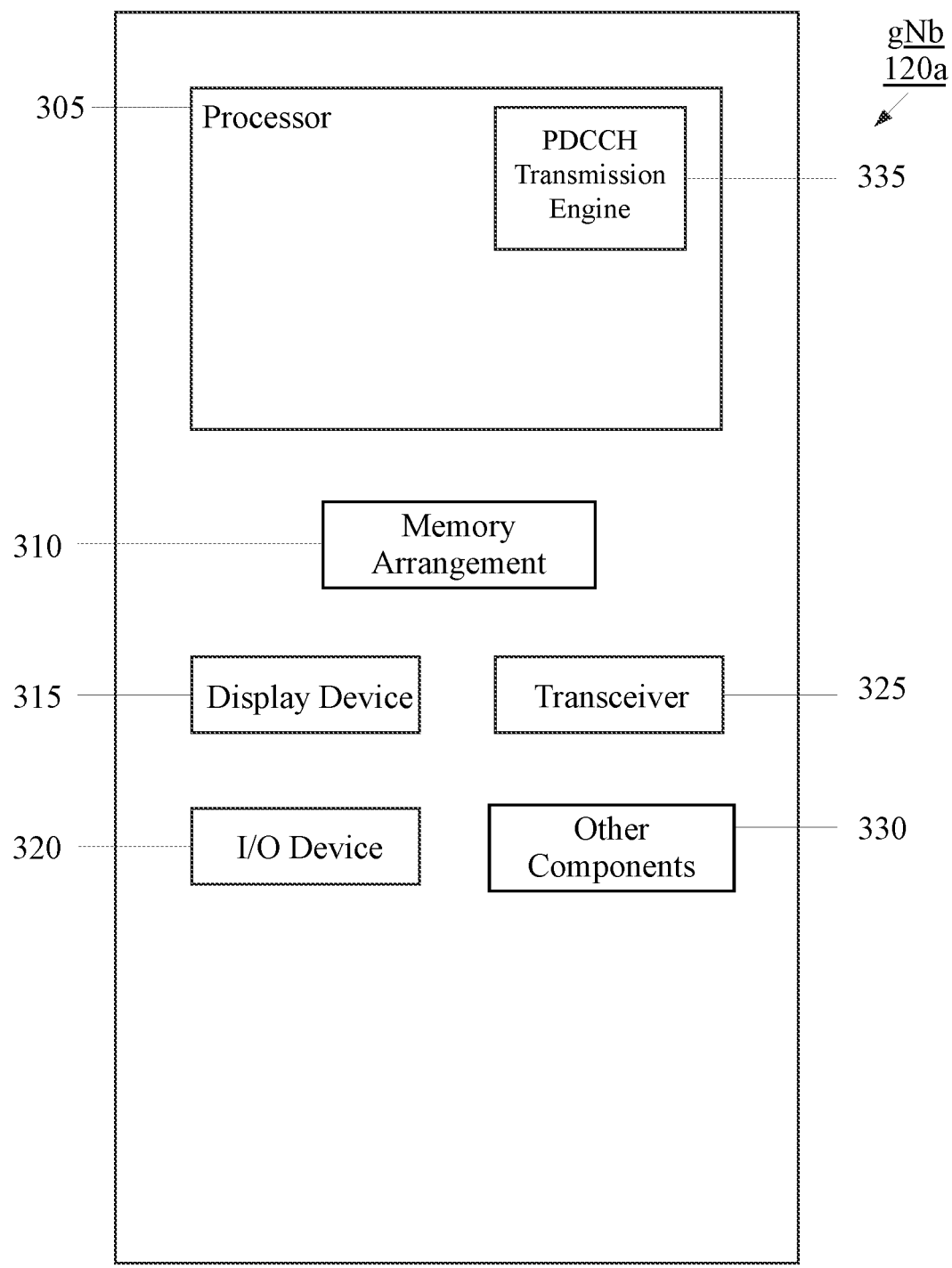
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a PDCCH transmission engine 335 for performing operations including transmitting a PDCCH to the UE using PDCCH repetition operations, as will be described in further detail below. The operations further include determining one or more scaling factors to be used by the UE for calculating a number of BDs used for PDCCH reception and signaling the scaling factor(s) to the UE.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

PDCCH Repetition Reception

A control resource set (CORESET) is a set of resource element groups (REG) (each REG comprising a resource block in the frequency domain and one OFDM symbol in the time domain) within which the UE attempts to blindly decode downlink control information (DCI) from the PDCCH. The CORESET may be considered a set of physical resources, e.g., a specific area on the NR downlink resource grid and a set of parameters that is used to carry PDCCH data e.g., downlink control information (DCI).

Each CORESET may have one or more search spaces (SS) defined. The PDCCH search space refers to an area in the downlink resource grid where the PDCCH may be carried. The downlink control channel is transmitted on an aggregation of one or more consecutive control channel elements (CCEs), each CCE comprising multiple resource element groups (REGs), e.g., 6 REGs (72 resource elements (REs)). The number of REs of a control resource set (CORESET) used to carry a PDCCH downlink control information (DCI) message is referred to as an aggregation level (AL) and is expressed in terms of CCEs. There are currently five different PDCCH CCE ALs supported in 5G NR (ALs 1, 2, 4 8 and 16) specifying the number of CCEs used to carry the PDCCH DCI message.

The PDCCH search space includes a UE-specific search space and a common (cell-specific) search space for the UE to monitor for potential DCI formats, including, e.g., downlink (DL) grants and uplink (UL) grants. The UE-specific search space is configured for the UE via Radio Resource Control (RRC) signaling and is dedicated to the specific UE, while the common search space is targeted to all or at least a group of UEs in the cell having a RRC connection with the network/gNB. A CCE index is the CCE number at which the PDCCH is allocated. For the UE to decode the PDCCH, the UE needs to know the location of the PDCCH (CCE index), structure, scrambling code, etc. However, the UE is not informed of the exact aggregation level (AL) or DCI format for the PDCCH reception. Instead, it is configured with a set of ALs and a number of DCI formats to ensure scheduling flexibility at the gNB side, and thus the UE performs blind decoding throughout the search space to find the PDCCH data (e.g., DCI).

Figure 4A:
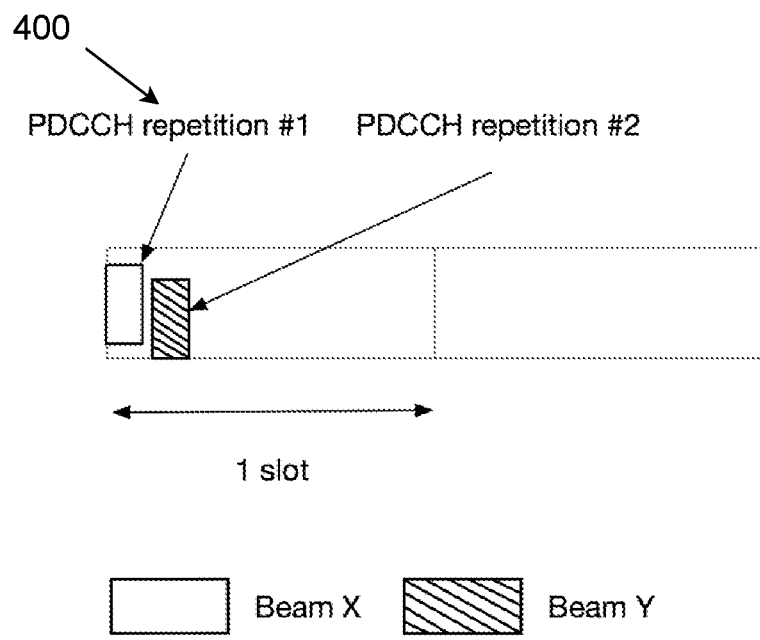
FIG. 4a shows an exemplary PDCCH transmission using intra-slot repetition.
Figure 4B:
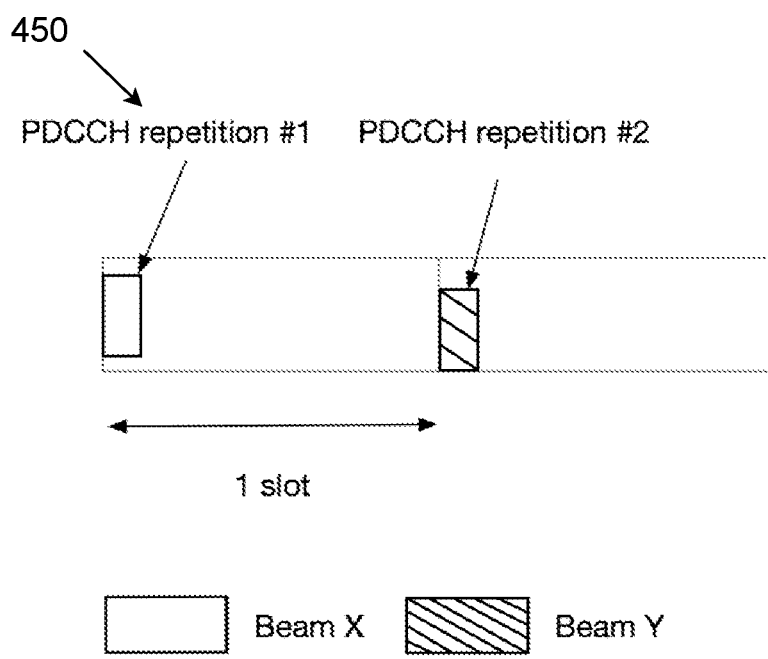
FIG. 4b shows an exemplary PDCCH transmission using inter-slot repetition.

In Rel-17 of the 3GPP standards, to improve the reliability of PDCCH decoding, PDCCH may be transmitted by multiple repetitions with different beams. Each repetition can be transmitted by an SS and an associated CORESET, wherein the SS provides a time domain resource and the CORESET provides a frequency resource and beam information. The repetitions may be transmitted within a slot (intra-slot repetition) or across slots (inter-slot repetition). FIG. 4a shows an exemplary PDCCH transmission 400 using intra-slot repetition, in which a first repetition and a second repetition are located within the same slot. FIG. 4b shows an exemplary PDCCH transmission 450 using inter-slot repetition, in which a first repetition is located within a first slot and a second repetition is located within a second slot. Additionally, as will be described further below, intra-slot repetitions may be transmitted across spans within a slot (inter-span repetition), the spans having a smaller granularity relative to the slot.

There are various schemes that may be used to detect the PDCCH when PDCCH repetition is used. In a first scheme, the UE may attempt to detect each PDCCH repetition independently. The PDCCH is considered "detected" if either one of the two repetitions is decoded successfully. In a second scheme, the UE combines the soft bits for each repetition and uses the combined soft bits to jointly decode the PDCCH.

When using the first scheme, the UE blindly detects the PDCCH candidate for each CORESET/SS. The number of blind decodes (BD) per slot is counted based on the control channel element (CCE) aggregation level(s) (ALs), number of RBs for the CORESET, etc., and should not exceed a predefined upper limit as currently specified in 3GPP TS 38.213 section 10.1.

When using the second scheme, the UE performs demodulation for each PDCCH candidate in a PDCCH candidate pair independently. The UE performs soft combining for the demodulated soft bits for each PDCCH in the PDCCH candidate pair. The number of BDs may be counted in the PDCCH candidate pair level. That is, each pair of PDCCH candidates carrying the same repetition is counted as one BD attempt. It should be understood that the while the term PDCCH candidate pair implies 2 repetitions, those skilled in the art will understand that the exemplary embodiments may be applied to a scheme having more than 2 repetitions (e.g., 3 or more repetitions).

Overbooking of a search space (SS) may occur when a number of BD/CCE configured for PDCCH decoding exceeds an upper limit, as currently defined in Table 10.2 and 10.3 in TS 38.213 for a primary serving cell (PCell). When overbooking occurs, some SSs may need to be dropped from the UE blind detection operation. In this case, the UE detects the common search space (CSS) first, starting from a lowest CSS ID and proceeds in increasing order of CSS ID, and then detects the UE-specific SS (USS) starting from a lowest USS ID and proceeds in increasing order of USS ID. For example, when the total number of BD/CCE exceeds the upper limit when a number (e.g., j) of BD/CCE of the USS is considered, the UE drops all the USS having an ID equal to and larger than j. If the total number of BD/CCE exceeds the upper limit when every configured USS is considered, the UE proceeds to drop CSS starting from a largest CSS ID.

The UE behavior for detecting the PDCCH is unclear with respect to the following PDCCH repetition scenarios. First, it is not specified how to count the BD limit for PDCCH repetitions with regard to the different receiving schemes (independent detection and soft combining), in particular for inter-slot PDCCH repetition with soft combining-based detection. Additionally, an overbooking impact should be considered with regard to BD counting for the different receiving schemes. Second, with regard to overbooking impact, it is not specified how to determine the dropping rule and scheduling offset or action delay for the DCI based on repetitions operation.

According to various exemplary embodiments described herein, a framework is described for BD/CCE counting and overbooking for PDCCH repetition operations.

For intra-slot repetition (FIG. 4a above), similar to Rel-15, the number of BD may be counted per slot. If the first receiving scheme (independent detection) is used, the number of BDs may be counted on a PDCCH candidate level independently, e.g. each candidate from a candidate pair is counted. If the second receiving scheme (soft combining) is used, the number of BDs may be counted on a PDCCH candidate pair level, e.g. each candidate pair is counted once. In another embodiment, a scaling factor may be used to scale the count value of the candidate pair, similar to the second option for inter-slot repetition with soft combining, to be explained in detail below.

For inter-slot repetition (FIG. 4b above), if the first receiving scheme (independent detection) is used, the number of BDs may be counted per slot. If the second receiving scheme (soft combining) is used, the number of BDs may be counted according to the following options.

In a first option, to be explained in detail below, for inter-slot repetition using the soft combining detection scheme, the BDs may be counted per slot, wherein different slots from the set of PDCCH repetitions may be counted differently according to a scaling factor, as will be described below. In a second option, to be explained in detail below, the BDs are counted in a multi-slot level, wherein the granularity of the BD count may be based on the duration for a set of PDCCH repetitions, as will be described below.

BD Counting for Inter-Slot PDCCH Repetition with Soft Combining—First Option

The UE may select different schemes to perform soft combining for a set of PDCCH repetitions in N slots, e.g., N=2. In a first scheme, the UE first detects the soft-bit for each of the PDCCH candidates in the first N−1 slot(s) and then detects the soft-bit for each of the PDCCH candidates in the last slot. The UE then performs soft combining for the soft bits for corresponding PDCCH candidates in a candidate pair and performs channel decoding by the combined soft bits. That is, the UE processes PDCCH candidates to detect the soft bits as the PDCCH are received and performs soft combining and decoding in the last slot when all the candidates for a candidate pair are received. In a second scheme, the UE buffers corresponding data for each of the PDCCH candidates in the first N−1 slot(s) and detects the soft-bits for all PDCCH candidates in the last slot. Similar to above, the UE performs soft combining and channel decoding in the last slot when all the candidates are received.

For each of the schemes described above, the UE complexity for a given slot may be different. For example, the UE may perform a reduced number of calculations in an earlier slot relative to the last slot, where, for example, soft bits for PDCCH candidates are combined and decoded. The BD limits are imposed in part to limit the UE complexity for searching and decoding the PDCCH. Thus, in some embodiments described herein, a scaling factor is introduced for counting a number of BDs in a slot which accounts for the differing UE complexity across multiple slots.

According to the first option introduced above, the BD count for the SSs for a PDCCH repetition set is scaled by scaling factors N1 and N2. The value of N1 may be used for SSs in the first N−1 slot(s) and N2 may be used for SSs in the last slot (N). In some exemplary embodiments, N2>N1 to account for the increased processing burden imposed in the last slot to perform the soft combining and channel decoding (which is not imposed in the earlier slots). The value of N2 may be configured based on the total number of candidate PDCCH repetition pairs.

The N1 and N2 values may be determined for the UE and the network in the following ways. In some exemplary embodiments, the UE may have N1 and N2 values configured based on UE capability, and can report the N1 and N2 values to the network. N1 and N2 may be different or the same for different configurations of CORESET/SS group and PDCCH candidate linkage scheme, e.g., N1 and N2 for CORESETs with different bandwidths could be different from N1 and N2 for CORESETs with the same bandwidth. Multiple schemes may be reported to the network so that the network may choose one for the UE based on the SS/CORESETs to be used for the PDCCH transmission.

In other exemplary embodiments, N1 and N2 may be configured for the UE via RRC signaling from the network. N1 and N2 may be configured per serving cell, per BWP, or per CORESET/SS group for a PDCCH repetition set. In still further exemplary embodiments, N1 and N2 can be predefined and known to both the UE and the network.

FIG. 5 shows a diagram 500 for counting blind decodes (BDs) in an exemplary PDCCH repetition operation according to various exemplary embodiments described herein. The diagram 500 relates to inter-slot PDCCH repetition using soft combining to decode the PDCCH, as described above. In the exemplary operation of FIG. 5, N1=0.5, N2=1.5, and two repetitions are used in each repetition set. The PDCCH candidates are 1:1 mapped in a repetition set.

The diagram 500 includes six slots, i.e., slots 0-5. In this exemplary operation, the UE is configured with three UE-specific search spaces (USS), i.e., USS 1, USS 2 and USS 3. A first PDCCH repetition set includes 10 BDs in USS 1 in slot 0 and 10 BDs in USS2 in slot 1. A second PDCCH repetition set includes 22 BDs in USS 2 in slot 2 and 22 BDs in USS1 in slot 3. A third PDCCH repetition set includes 20 BDs in USS 2 in slot 4 and 20 BDs in USS1 in slot 5. USS 3 is configured for 20 BDs in slots 0 and 1, 18 BDs in slot 2, 16 BDs in slots 3 and 4, and 20 BDs in slot 5, which are not configured for PDCCH repetition.

For purposes of counting BDs to ensure the BDs per slot are within the maximum specified BD limit, the factors N1 and N2 are applied to the SSs carrying a PDCCH repetition. As noted above, N1=0.5 for earlier slots in the repetition scheme (slots 0, 2 and 4) and N2=1.5 for the last slot in the repetition scheme (slots 1, 3 and 5). Thus, the total number of BD for slot 0 is equal to 20 (for USS 3)+10*0.5 (for USS 1)=25. The total number of BD for slot 1 is equal to 20 (for USS 3)+10*1.5 (for USS 1)=35. The total number of BD for slot 2 is equal to 18 (for USS 3)+22*0.5 (for USS 2)=29. The total number of BD for slot 3 is equal to 16 (for USS 3)+22*1.5 (for USS 1)=49. The total number of BD for slot 4 is equal to 16 (for USS 3)+20*0.5 (for USS 2)=26. The total number of BD for slot 5 is equal to 20 (for USS 3)+20*1.5 (for USS 1)=50.

Overbooking Handling

If the number of BDs configured for a slot exceeds a maximum specified BD limit, then the slot is considered to be overbooked. In an overbooking scenario, some SS may be prioritized for searching (e.g., PDCCH detection) while other SS are dropped (not searched) so that the UE does not exceed the BD limit. The following options are available for the UE to handle overbooked slots.

In a first option, the priority may be determined based on the highest or lowest priority SS/CORESET in a SS/CORESET group for PDCCH repetition. That is, SS/CORESET are identified that are configured to carry a PDCCH repetition from a PDCCH candidate pair, and a priority between these one or more SS/CORESET is determined based on the SS/CORESET ID. These SS/CORESET are dropped based on the determined priority until the BD/CCE are within the specified limit. When one SS from a group of SS is dropped, the whole SS group may be dropped.

In a second option, the priority may be counted per SS/CORESET level. That is, regardless of which SS/CORESET carries a PDCCH repetition, the priority is determined between all of the SS/CORESET configured for the UE. These SS/CORESET are dropped based on the determined priority until the BD/CCE are within the specified limit. Similar to the first option, if one SS is dropped, the whole SS group should be dropped.

In a third option, the priority may be counted per SS level. If one SS is dropped, the other SS(s) in the SS group can still be used. In such a scenario, the number of BD may be recalculated, since the UE may change receiving schemes. An additional or predefined set of N1 and N2 may be applied for recalculating the BD, e.g., N1=1, N2=1, which implies UE would use the soft combining receiving scheme). In some embodiments, the scheduling offset and DCI action delay may be counted based on the last actually transmitted PDCCH repetition, while in other embodiments, the scheduling offset and DCI action delay may be counted based on the latest nominal PDCCH repetition. The third option will be explained in further detail below with respect to FIG. 6.

In a fourth option, the UE may be configured with different priority orders by higher layers for different search space sets. In case of overbooking, the PDCCH candidate(s) is dropped in an increasing or decreasing order of PDCCH candidates index starting from the lower prioritized search spaces sets. In some designs, to further reduce UE complexity, PDCCH candidates may be dropped on an aggregation level (AL) basis, i.e., once one candidate is dropped for a given AL, all candidates associated with this AL are dropped.

FIG. 6 shows a diagram 600 for counting blind decodes (BDs) for a search space overbooking scenario in an exemplary PDCCH repetition operation according to various exemplary embodiments described herein. The diagram 600 relates to inter-slot PDCCH repetition using soft combining to decode the PDCCH, as described above, for overbooking handling according to the third option (priority counted per SS level, where if one SS is dropped the other SSs in the group are still used). In the exemplary operation of FIG. 6, N1=0.5, N2=1.5, and two repetitions are used in each repetition set. The PDCCH candidates are 1:1 mapped in a repetition set.

The diagram 600 includes six slots, i.e., slot 0-5. In this exemplary operation, the UE is configured with a common search space (CSS 0) and two UE-specific search spaces (USS), i.e., USS 1 and USS 2. A first PDCCH repetition set includes 10 BDs in USS 1 in slot 0 and 10 BDs in USS2 in slot 1. A second PDCCH repetition set includes 22 BDs in USS 2 in slot 2 and 22 BDs in USS1 in slot 3. A third PDCCH repetition set includes 20 BDs in USS 2 in slot 4 and 20 BDs in USS1 in slot 5. CSS 0 is configured for 20 BDs in slots 0 and 1, 18 BDs in slot 2, 16 BDs in slots 3 and 4, and 20 BDs in slot 5, which are not configured for PDCCH repetition.

In the example of FIG. 6, the maximum number of BD is 44 per slot. Similar to FIG. 5 above, for purposes of counting BDs to ensure the BDs per slot are within the maximum specified BD limit (44), the factors N1 and N2 are applied to SS carrying a PDCCH repetition. As noted above, N1=0.5 for earlier slots in the repetition scheme (slots 0, 2 and 4) and N2=1.5 for the last slot in the repetition scheme (slots 1, 3 and 5). Thus, the total number of BD for slot 0 is equal to 20 (for CSS 0)+10*0.5 (for USS 1)=25. The total number of BD for slot 1 is equal to 20 (for CSS 0)+10*1.5 (for USS 1)=35. The total number of BDs for slots 0 and 1 is within the maximum BD limit of 44, so no overbooking operations are needed to reduce the BDs to within acceptable limits.

For slots 2-5, however, an overbooking operation is applied in the following manner. For slot 3, if the BD limit were disregarded, the total number of BD would be 16 (for CSS 0)+22*1.5 (for USS1)=49. However, in view of the BD limit of 44, slot 3 would be overbooked. Thus, as shown in FIG. 5, USS 1 is dropped in slot 3. Dropping USS 1 causes the second repetition of PDCCH repetition set 2 to not be detected, leaving only the first repetition of set 2 to be detected in USS 2 in slot 2. Because the soft combining operation cannot be performed, the UE reverts to the independent detection scheme for the payload of the PDCCH repetition set 2. Thus, the total number of BD for slot 2 is equal to 18 (for CSS 0)+22 (for USS 2)=40. As shown in the above calculation, because the detection scheme has changed, the BDs for USS 2 are not scaled (as they would be if the soft combining operation were used). The total number of BD for slot 3 is equal to 16 (for CSS 0), in view of USS 1 being dropped. Thus, the BD count for slots 2 and 3 are within the BD limit of 44.

Similar to above, for slot 5, if the BD limit were disregarded, the total number of BD would be 20 (for CSS 0)+20*1.5 (for USS1)=50. However, in view of the BD limit of 44, slot 5 would be overbooked. Thus, as shown in FIG. 5, USS 1 is dropped from slot 5. Dropping USS 1 causes the second repetition of PDCCH repetition set 3 to be not detected, leaving only the first repetition of set 3 to be detected in USS 2 in slot 4. Similar to above, the UE reverts to the independent detection scheme for the payload of the PDCCH repetition set 3. Thus, the total number of BD for slot 4 is equal to 16 (for CSS 0)+20 (for USS 2)=36. The total number of BD for slot 5 is equal to 20 (for CSS 0), in view of USS 1 being dropped. Thus, the BD count for slots 4 and 5 are within the BD limit of 44.

BD Counting for Inter-Slot PDCCH Repetition with Soft Combining—Second Option

For soft combining for N PDCCH repetitions, the UE still needs to perform some additional steps, e.g., resource demapping, channel estimation, demodulation and so on for N−1 repetitions. According to the second option for inter-slot repetition using the soft combining detection scheme, the number of BDs are counted based on the maximum duration for SSs in a group. For this option, each SS in a group should not span across a BD granularity (e.g., a frequency sub-band for the SS group).

The number of BD is scaled by a factor X for SSs in a group. In some embodiments, the UE can report an X value based on UE capability. In other embodiments, the value of X can be configured by RRC signaling, e.g., per serving cell, per BWP or per CORESET/SS group for a PDCCH repetition set. In still further embodiments, X can be predefined. The maximum number of BDs for the duration may also be predefined, configured by gNB, or reported by UE. For overbooking handling, the four options discussed above may be used for BD re-calculation when an SS/CORESET is dropped.

Figure 7:
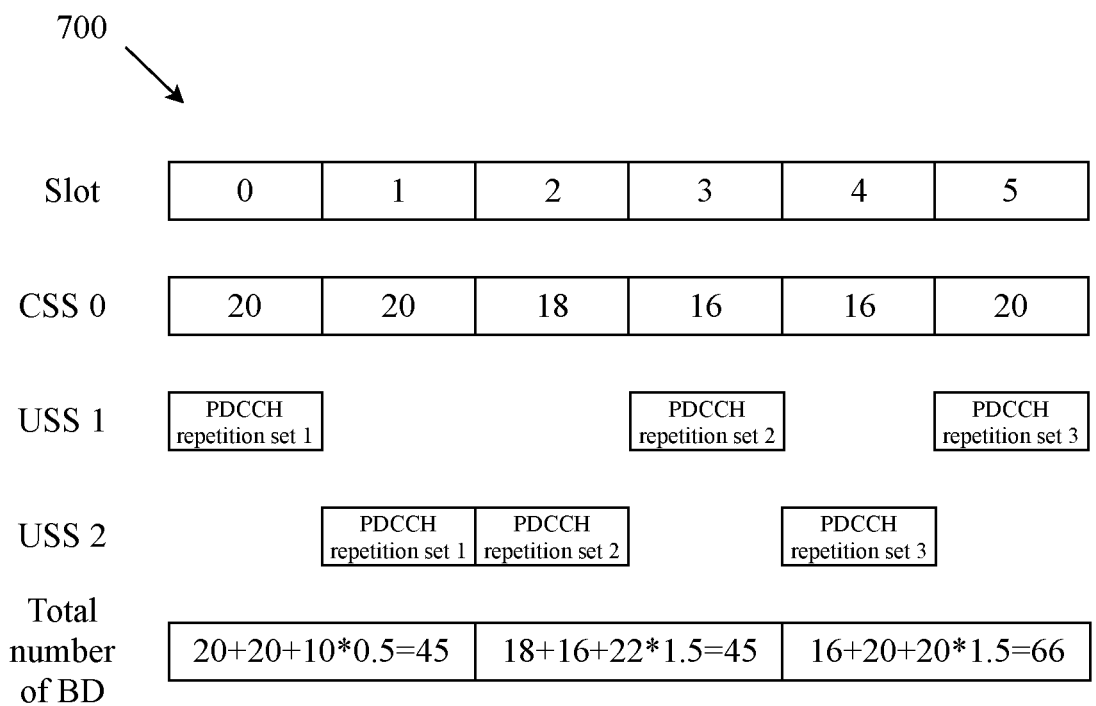
FIG. 7 shows a diagram for counting blind decodes (BDs) in an exemplary PDCCH repetition operation on a multi-slot basis according to various exemplary embodiments described herein.

FIG. 7 shows a diagram 700 for counting blind decodes (BDs) in an exemplary PDCCH repetition operation on a multi-slot basis according to various exemplary embodiments described herein. The diagram 700 relates to inter-slot PDCCH repetition using soft combining to decode the PDCCH, as described above. In the exemplary operation of FIG. 7, X=1.5 and two repetitions are used in each repetition set. The PDCCH candidates are 1:1 mapped in a repetition set.

The diagram 700 includes six slots, i.e., slot 0-5. In this exemplary operation, the UE is configured with a common search space (CSS 0) and two UE-specific search spaces (USS), i.e., USS 1 and USS 2. A first PDCCH repetition set includes 10 BDs in USS 1 in slot 0 and 10 BDs in USS2 in slot 1. A second PDCCH repetition set includes 22 BDs in USS 2 in slot 2 and 22 BDs in USS1 in slot 3. A third PDCCH repetition set includes 20 BDs in USS 2 in slot 4 and 20 BDs in USS1 in slot 5. CSS 0 is configured for 20 BDs in slots 0 and 1, 18 BDs in slot 2, 16 BDs in slots 3 and 4, and 20 BDs in slot 5, which are not configured for PDCCH repetition.

For purposes of counting BDs to ensure the BDs are within the maximum specified BD limit, considered on a multi-slot basis, the factor X is applied to the BD count for the SS in the SS group carrying a PDCCH repetition. As noted above, X=1.5. Thus, the total number of BD for slots 0-1 is equal to 20 (for CSS 0 slot 0)+20 (for CSS 0 slot 1)+10*1.5 (for repetition set 1 including USS 1 in slot 0 and USS 2 in slot 1)=45. The total number of BD for slots 2-3 is equal to 18 (for CSS 0 slot 2)+16 (for CSS 0 slot 3)+22*1.5 (for repetition set 2 including USS 2 in slot 2 and USS 1 in slot 3)=45. The total number of BD for slots 4-5 is equal to 16 (for CSS 0 slot 4)+20 (for CSS 0 slot 5)+20*1.5 (for repetition set 3 including USS 2 in slot 4 and USS 1 in slot 5)=66.

Span-Based Monitoring

In TS 38.213 section 10.1, per span-based PDCCH monitoring is supported. A span is a smaller granularity compared to a slot based on the same SCS, and is defined as (X, Y) symbols, where X is the number of consecutive symbols for a span and Y indicates the number of symbols used for PDCCH within a span.

The two options discussed above for slot-based operation may be extended to span-based operation. That is, the two options for inter-slot repetition using the soft combining detection scheme may be equivalently applied for inter-span repetition using the soft combining detection scheme. Thus, the exemplary embodiments are extended to intra-slot PDCCH repetition when the repetitions are across spans.

Methods

Figure 8:
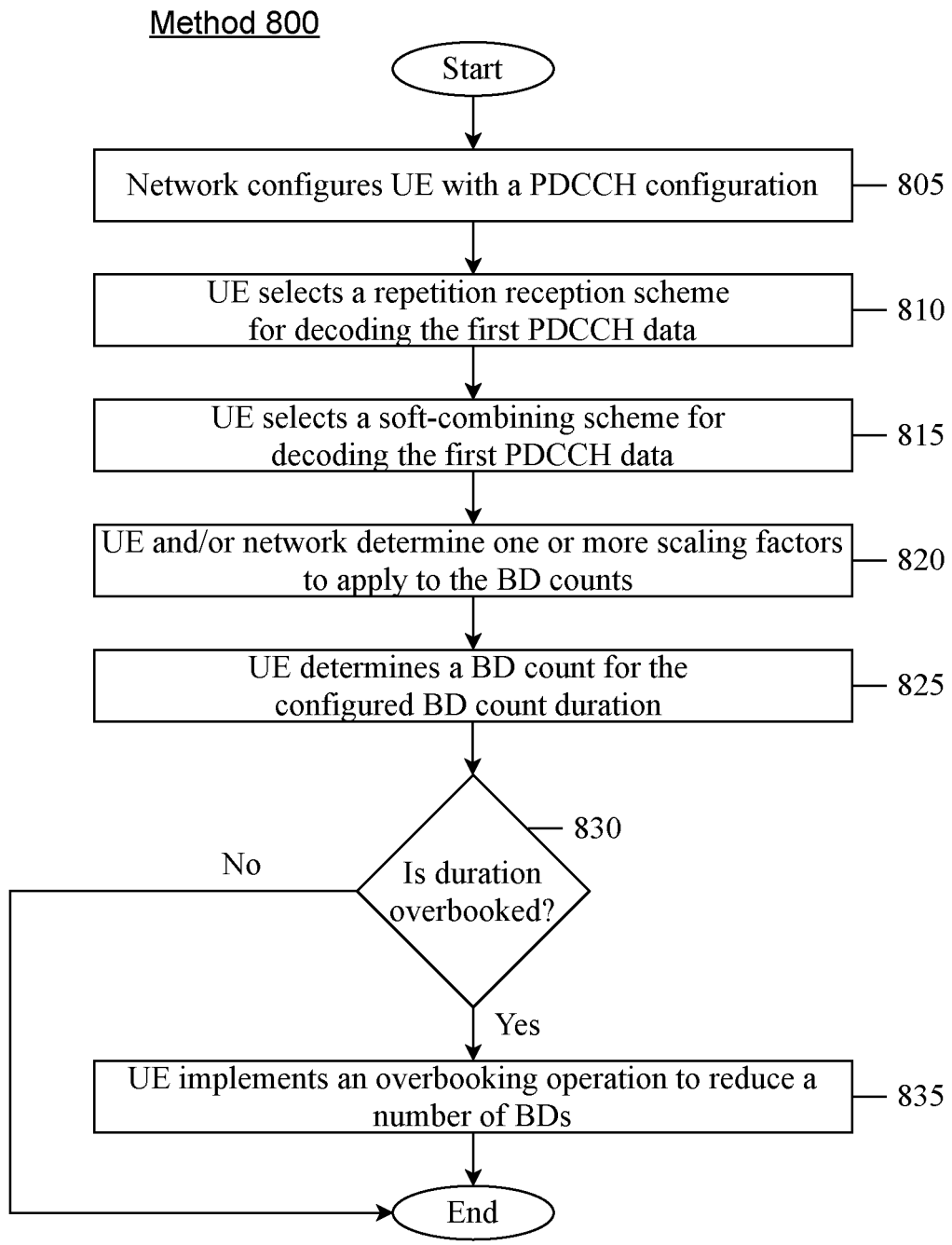
FIG. 8 shows a method for counting blind decodes (BD) in an exemplary PDCCH repetition operation according to various exemplary embodiments described herein.

FIG. 8 shows a method 800 for counting blind decodes (BD) in an exemplary PDCCH repetition operation according to various exemplary embodiments described herein. The method 800 relates to inter-slot or inter-span PDCCH repetition using soft combining to decode the PDCCH, as discussed above.

In 805, a network configures a user equipment (UE) with a PDCCH configuration, the PDCCH configuration including at least one repetition set for first PDCCH data e.g., first DCI. As discussed above, a PDCCH payload may be subject to a repetition configuration in which the same payload is transmitted multiple times within a slot (intra-slot) or across slots (inter-slot) or within a span (intra-span) or across spans (inter-span). In the exemplary PDCCH operation of FIG. 8, the repetition configuration is an inter-slot or inter-span configuration. The first PDCCH data may be configured with two or more repetitions across the multiple slots/spans.

In 810, the UE selects a repetition reception scheme for decoding the first PDCCH data. As discussed above, the UE may attempt to decode each repetition independently or may perform soft-combining for detected bits from each of the repetitions. In the exemplary PDCCH operation of FIG. 8, the UE selects soft-combining as the repetition reception scheme for decoding the first PDCCH data.

In 815, the UE selects a soft-combining scheme for decoding the first PDCCH data. As discussed above, in a first soft-combining scheme, the UE may detect the soft-bit for each of the PDCCH candidates in the first N−1 slot(s)/span(s) and then detect the soft-bit for each of the PDCCH candidates in the last slot/span. The UE then performs soft combining for the soft bits for corresponding PDCCH candidates in a candidate pair and performs channel decoding by the combined soft bits. In a second soft-combining scheme, the UE may buffer the corresponding data for each of the PDCCH candidates in the first N−1 slot(s)/span(s) and detects the soft-bits for all PDCCH candidates in the last slot/span. Similar to above, the UE performs soft combining and channel decoding in the last slot/span when all the candidates are received.

In 820, the UE and/or the network determine one or more scaling factors to apply to the BD counts for the slots carrying the PDCCH candidates subject to repetition. The BD count may be determined on a per-slot basis (e.g., FIG. 5 above), on a multi-slot basis (e.g., FIG. 7 above) or on a per-span basis, as discussed above. Depending on the configured BD count operation (per-slot, multi-slot, per-span), different scaling factors may be used.

In the per-slot or per-span BD count operation, scaling factors N1 and N2 may be used. The scaling factor N1 may be used for earlier slots/spans (e.g., the first N−1 slots/spans out of N slots/spans carrying the PDCCH repetitions of the first PDCCH data) and the scaling factor N2 may be used for the last slot/span (e.g., slot/span N). In the multi-slot BD count operation, a scaling factor X may be used.

The scaling factors may be determined in the following ways. In some embodiments, the UE may have scaling factor values configured based on UE capability, and can report the values to the network. If multiple potential scaling factor value options are reported, the network may select one of the options and signal the configuration to the UE. In other embodiments, the network configures the scaling factor value(s) via e.g., RRC signaling. In still further embodiments, the scaling factor value(s) are predefined.

In 825, the UE determines a BD count for the configured BD count duration (per-slot, multi-slot, or per-span). Generally, the BDs are summed for each of the SS/CORESET configured for PDCCH reception for the duration. For example, multiple SS may be configured, each carrying some number of PDCCH candidates that are blindly decoded to locate the PDCCH data. However, when some of the PDCCH candidates are configured to carry PDCCH repetitions from a repetition set, the scaling factor(s) is applied to these PDCCH candidates.

Regarding per-slot or per-span BD counting, as discussed above, N1 is applied to SS/CORESET configured in earlier slots/spans and N2 is applied to SS/CORESET configured in the last slot/span. Thus, if an SS is configured to carry a repetition in a given slot/span, the PDCCH candidates for that SS are scaled for that slot/span. Regarding multi-slot BD counting, as discussed above, the BD value for the PDCCH candidates repeated across the multiple slots is equal to a number of PDCCH candidates for a single one of the slots, scaled by the scaling factor X.

In 830, the UE determines whether a duration is overbooked by comparing the BD count for the duration to the maximum specified BD limit for the slot.

In 835, when the UE determines that a duration is overbooked, the UE implements an overbooking operation to reduce a number of BDs. The overbooking operations generally comprise dropping certain SS based on a priority order until the BD count is within the specified limits. Various options are available for determining the priority, which may be based on e.g., the SS IDs for the set of configured SSs, as discussed in detail above.

EXAMPLES

In a first example, a user equipment (UE) comprising a transceiver configured to communicate with a network and a processor communicatively coupled with the transceiver and configured to perform operations is provided. The operations comprise receiving a configuration for a physical downlink control channel (PDCCH) including repetitions for PDCCH candidates comprising first PDCCH data, wherein the PDCCH candidates are repeated across multiple durations of a DL resource grid, detecting, based on a repetition detection scheme, each of the PDCCH candidates and combining soft bits from each of the PDCCH candidates, wherein the combined soft bits are jointly decoded to determine the first PDCCH data and calculating a number of blind decodes (BDs) for the durations of the DL resource grid carrying the PDCCH candidates, wherein at least one BD value for the PDCCH candidates is scaled by a scaling factor for the calculation of the number of BDs.

In a second example, the UE of the first example, wherein the duration is a slot or a span, and wherein a first BD value for PDCCH candidates from an earlier one of the durations N−1 are scaled by a first scaling factor and a second BD value for PDCCH candidates from a last duration N are scaled by a second scaling factor different from the first scaling factor.

In a third example, the UE of the second example, wherein the second scaling factor for the last duration N is greater than the first scaling factor for the earlier durations N−1.

In a fourth example, the UE of the third example, wherein the first and second scaling factors are dependent on a soft combining scheme used by the UE for the PDCCH candidate decoding, wherein a first soft combining scheme comprises detecting the soft bits from each of the earlier durations N−1 and the last duration N and combining the soft bits in the last duration N and wherein a second soft combining scheme comprises buffering data from each of the earlier durations N−1, detecting the soft bits from each of the earlier durations in the last duration N and combining the soft bits in the last duration N.

In a fifth example, the UE of the third example, wherein the first and second scaling factors are dependent on a configuration of a control resource set (CORESET) and search space (SS) for the multiple durations of the DL resource grid carrying the PDCCH candidates.

In a sixth example, the UE of the first example, wherein the duration is a slot, and wherein a BD value is calculated on an inter-slot basis for the multiple slots, the BD value for the PDCCH candidates repeated across the multiple slots being equal to a number of PDCCH candidates for a single one of the slots scaled by a scaling factor.

In a seventh example, the UE of the first example, wherein the number of BDs for the durations is calculated by summing the at least one BD value for the PDCCH candidates with additional BD values for additional PDCCH candidates carried in the DL resource grid and wherein the number of BDs is compared to a maximum BD limit to determine whether one or more of the durations comprises a number of BDs exceeding the maximum BD limit.

In an eighth example, the UE of the seventh example, wherein the operations further comprise performing an overbooking operation when the one or more of the durations comprises a number of BDs exceeding the maximum BD limit.

In a ninth example, the UE of the eighth example, wherein the overbooking operation comprises dropping certain ones of the configured PDCCH candidates so that the candidates are not searched and recalculating the number of BDs without including the PDCCH candidates that are dropped.

In a tenth example, the UE of the ninth example, wherein the overbooking operation further comprises determining a priority for each of a plurality of search spaces (SS), wherein a lowest priority SS is dropped until the number of BDs is within the maximum BD limit.

In an eleventh example, the UE of the tenth example, wherein the priority is determined based on an SS group and an SS identifier, wherein the SS group comprises one of a common search space (CSS) or a UE-specific search space (USS).

In a twelfth example, the UE of the eleventh example, wherein an entirety of a given SS group is dropped when one SS from the SS group is dropped.

In a thirteenth example, the UE of the eleventh example, wherein, when one of the PDCCH candidates repeated across the multiple durations is dropped, the other ones of the PDCCH candidates are not dropped.

In a fourteenth example, the UE of the thirteenth example, wherein, when one of the PDCCH candidates repeated across the multiple durations is dropped, the other ones of the PDCCH candidates are not dropped, and when only a single PDCCH candidate from a set of PDCCH candidates subject to repetition has not been dropped, the operations further comprise decoding the PDCCH candidate without soft combining and not using the scaling factor to calculate the BD value.

In a fifteenth example, the UE of the thirteenth example, wherein a scheduling offset and a DCI action delay is counted based on either a last actually transmitted PDCCH repetition or a latest nominal PDCCH repetition.

In a sixteenth example, the UE of the ninth example, wherein the priority is determined based on higher layer signaling.

In a seventeenth example, the UE of the first example, wherein the scaling factor is based on UE capability and the operations further comprise reporting at least one potential scaling factor to the network.

In a eighteenth example, the UE of the seventeenth example, wherein the operations further comprise receiving a configuration for the scaling factor from the network, wherein the scaling factor is selected from the reported at least one potential scaling factor.

In a nineteenth example, the UE of the first example, wherein the operations further comprise receiving the scaling factor from the network via radio resource control (RRC) signaling.

Those skilled in the art will understand that the above-described exemplary embodiments may be implemented in any suitable software or hardware configuration or combination thereof. An exemplary hardware platform for implementing the exemplary embodiments may include, for example, a desktop platform having an operating system, a mobile device having an operating system. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor configured to perform operations comprising:
    receiving a configuration for a physical downlink control channel (PDCCH) including repetitions for PDCCH candidates comprising first PDCCH data, wherein the PDCCH candidates are repeated across multiple durations of a DL resource grid;
    detecting, based on a repetition detection scheme, each of the PDCCH candidates and combining soft bits from each of the PDCCH candidates, wherein the combined soft bits are jointly decoded to determine the first PDCCH data;
    calculating a number of blind decodes (BDs) for the durations of the DL resource grid carrying the PDCCH candidates, wherein at least one BD value for the PDCCH candidates is scaled by a scaling factor for the calculation of the number of BDs;
    comparing the number of BDs to a maximum BD limit;
    determining whether one or more of the durations comprises a number of BDs exceeding the maximum BD limit;
    performing an overbooking operation when the one or more of the durations comprises a number of BDs exceeding the maximum BD limit; and
    determining a priority for each of a plurality of search spaces (SS), wherein a lowest priority SS is dropped until the number of BDs is within the maximum BD limit, wherein the priority is determined based on an SS group and an SS identifier, wherein the SS group comprises one of a common search space (CSS) or a user equipment (UE)-specific search space (USS).

2. The processor of claim 1, wherein the duration is a slot or a span, and
    wherein a first BD value for PDCCH candidates from an earlier one of the durations N−1 are scaled by a first scaling factor and a second BD value for PDCCH candidates from a last duration N are scaled by a second scaling factor different from the first scaling factor.

3. The processor of claim 2, wherein the second scaling factor for the last duration N is greater than the first scaling factor for the earlier durations N−1.

4. The processor of claim 3, wherein the first and second scaling factors are dependent on a soft combining scheme used by a user equipment (UE) for the PDCCH candidate decoding,
    wherein a first soft combining scheme comprises detecting the soft bits from each of the earlier durations N−1 and the last duration N and combining the soft bits in the last duration N and;
    wherein a second soft combining scheme comprises buffering data from each of the earlier durations N−1, detecting the soft bits from each of the earlier durations in the last duration N and combining the soft bits in the last duration N.

5. The processor of claim 3, wherein the first and second scaling factors are dependent on a configuration of a control resource set (CORESET) and search space (SS) for the multiple durations of the DL resource grid carrying the PDCCH candidates.

6. The processor of claim 1, wherein the duration is a slot, and
    wherein a BD value is calculated on an inter-slot basis for the multiple slots, the BD value for the PDCCH candidates repeated across the multiple slots being equal to a number of PDCCH candidates for a single one of the slots scaled by a scaling factor.

7. The processor of claim 1, wherein the number of BDs for the durations is calculated by summing the at least one BD value for the PDCCH candidates with additional BD values for additional PDCCH candidates carried in the DL resource grid.

8. The processor of claim 7, wherein the overbooking operation comprises:
    dropping certain ones of the configured PDCCH candidates so that the candidates are not searched; and
    recalculating the number of BDs without including the PDCCH candidates that are dropped.

9. The processor of claim 1, wherein an entirety of a given SS group is dropped when one SS from the SS group is dropped.

10. The processor of claim 1, wherein, when one of the PDCCH candidates repeated across the multiple durations is dropped, the other ones of the PDCCH candidates are not dropped.

11. The processor of claim 10, wherein, when one of the PDCCH candidates repeated across the multiple durations is dropped, the other ones of the PDCCH candidates are not dropped, and when only a single PDCCH candidate from a set of PDCCH candidates subject to repetition has not been dropped, the operations further comprise decoding the PDCCH candidate without soft combining and not using the scaling factor to calculate the BD value.

12. The processor of claim 10, wherein a scheduling offset and a DCI action delay is counted based on either a last actually transmitted PDCCH repetition or a latest nominal PDCCH repetition.

13. The processor of claim 1, wherein the scaling factor is based on UE capability and the operations further comprise:

reporting at least one potential scaling factor to the network.

14. The processor of claim 13, wherein the operations further comprise:

receiving a configuration for the scaling factor from the network, wherein the scaling factor is selected from the reported at least one potential scaling factor.

15. A user equipment (UE), comprising:

a transceiver configured to communicate with a network; and a processor communicatively coupled with the transceiver and configured to perform operations comprising:

receiving a configuration for a physical downlink control channel (PDCCH) including repetitions for PDCCH candidates comprising first PDCCH data, wherein the PDCCH candidates are repeated across multiple durations of a DL resource grid;

detecting, based on a repetition detection scheme, each of the PDCCH candidates and combining soft bits from each of the PDCCH candidates, wherein the combined soft bits are jointly decoded to determine the first PDCCH data; and calculating a number of blind decodes (BDs) for the durations of the DL resource grid carrying the PDCCH candidates, wherein at least one BD value for the PDCCH candidates is scaled by a scaling factor for the calculation of the number of BDs;

comparing the number of BDs to a maximum BD limit;

determining whether one or more of the durations comprises a number of BDs exceeding the maximum BD limit;

performing an overbooking operation when the one or more of the durations comprises a number of BDs exceeding the maximum BD limit; and determining a priority for each of a plurality of search spaces (SS), wherein a lowest priority SS is dropped until the number of BDs is within the maximum BD limit, wherein the priority is determined based on an SS group and an SS identifier, wherein the SS group comprises one of a common search space (CSS) or a UE-specific search space (USS).

16. An apparatus comprising processing circuitry configured to perform operations comprising:

configuring a physical downlink control channel (PDCCH) for a user equipment (UE), the PDCCH including repetitions for PDCCH candidates comprising first PDCCH data, wherein the PDCCH candidates are repeated across multiple durations of a DL resource grid, wherein the UE is to use a repetition detection scheme to detect each of the PDCCH candidates and combine soft bits from each of the PDCCH candidates, wherein the combined soft bits are jointly decoded to determine the first PDCCH data; and generating, for signaling to the UE, a scaling factor for the calculation of a number of blind decodes (BDs) for the durations of the DL resource grid carrying the PDCCH candidates, wherein the UE scales at least one BD value for the PDCCH candidates by the scaling factor for the calculation of the number of BDs, wherein the duration is a span and a first BD value for PDCCH candidates from an earlier one of the durations N−1 are scaled by a first scaling factor and a second BD value for PDCCH candidates from a last duration N are scaled by a second scaling factor different from the first scaling factor.

17. The apparatus of claim 16, wherein the operations further comprise:

receiving at least one potential scaling factor from the UE, the at least one potential scaling factor being based on UE capability; and selecting one scaling factor from the at least one potential scaling factor for the UE to use in the calculation.

18. The apparatus of claim 16, wherein the operations further comprise:

generating, for signaling to the UE, a priority for each of a plurality of search spaces (SS) wherein, when one or more durations of the configured PDCCH comprises a number of BDs exceeding a maximum BD limit, the UE drops a lowest priority SS until the number of BDs is within the maximum BD limit.

19. The apparatus of claim 16, further comprising transceiver circuitry.

20. The apparatus of claim 16, further comprising an antenna.

* * * * *